United States Patent [19]
Dupuy

[11] Patent Number: 5,345,718
[45] Date of Patent: Sep. 13, 1994

[54] GLASS RUN GUIDE FOR SLIDABLE VEHICLE WINDOW

[75] Inventor: Ronald E. Dupuy, Wabash, Ind.

[73] Assignee: GenCorp Inc., Fairlawn, Ohio

[21] Appl. No.: 67,197

[22] Filed: May 25, 1993

[51] Int. Cl.⁵ ............................................. E05D 15/16
[52] U.S. Cl. .................................................... 49/441
[58] Field of Search ........................ 49/441, 440, 227

[56] References Cited

U.S. PATENT DOCUMENTS

| | | | |
|---|---|---|---|
| 3,858,356 | 1/1975 | Gross | 49/440 X |
| 4,098,134 | 7/1978 | Kondo | |
| 4,827,669 | 5/1989 | Hlavaty et al. | 49/441 X |
| 5,013,379 | 5/1991 | Brooks et al. | 49/441 X |
| 5,067,281 | 11/1991 | Dupuy | 49/441 X |
| 5,086,586 | 2/1992 | Hlavaty et al. | 49/441 X |
| 5,095,655 | 3/1992 | Warren | 49/441 X |
| 5,195,273 | 3/1993 | Yamano et al. | 49/441 |

Primary Examiner—Philip C. Kannan
Attorney, Agent, or Firm—Robert F. Rywalski; Gunther J. Evanina; Frank C. Rote, Jr.

[57] ABSTRACT

A one-piece glass run guide for retaining and smoothly guiding a slidable vehicle window includes a molded polymeric strip having a substantially U-shaped transverse cross section including a base, an inboard leg having a projecting lip portion which engages an interior surface of a slidable vehicle window, and an outboard leg having a projecting lip portion which engages an exterior surface of the slidable vehicle window. The one-piece glass run guide of the invention is formed of a fiber reinforced polymer having sufficient strength and rigidity to counter forces exerted by the sliding vehicle window to prevent undesirable inboard, outboard, forward and rearward movement of the window, while at least the surfaces of the lip portions which contact the surfaces of the slidable vehicle window are low friction, non-abrasive surfaces which facilitate smooth movement of the window as it is raised or lowered. The invention, therefore, performs, with a one-piece guide, two different functions which are conventionally performed by separate components.

19 Claims, 3 Drawing Sheets

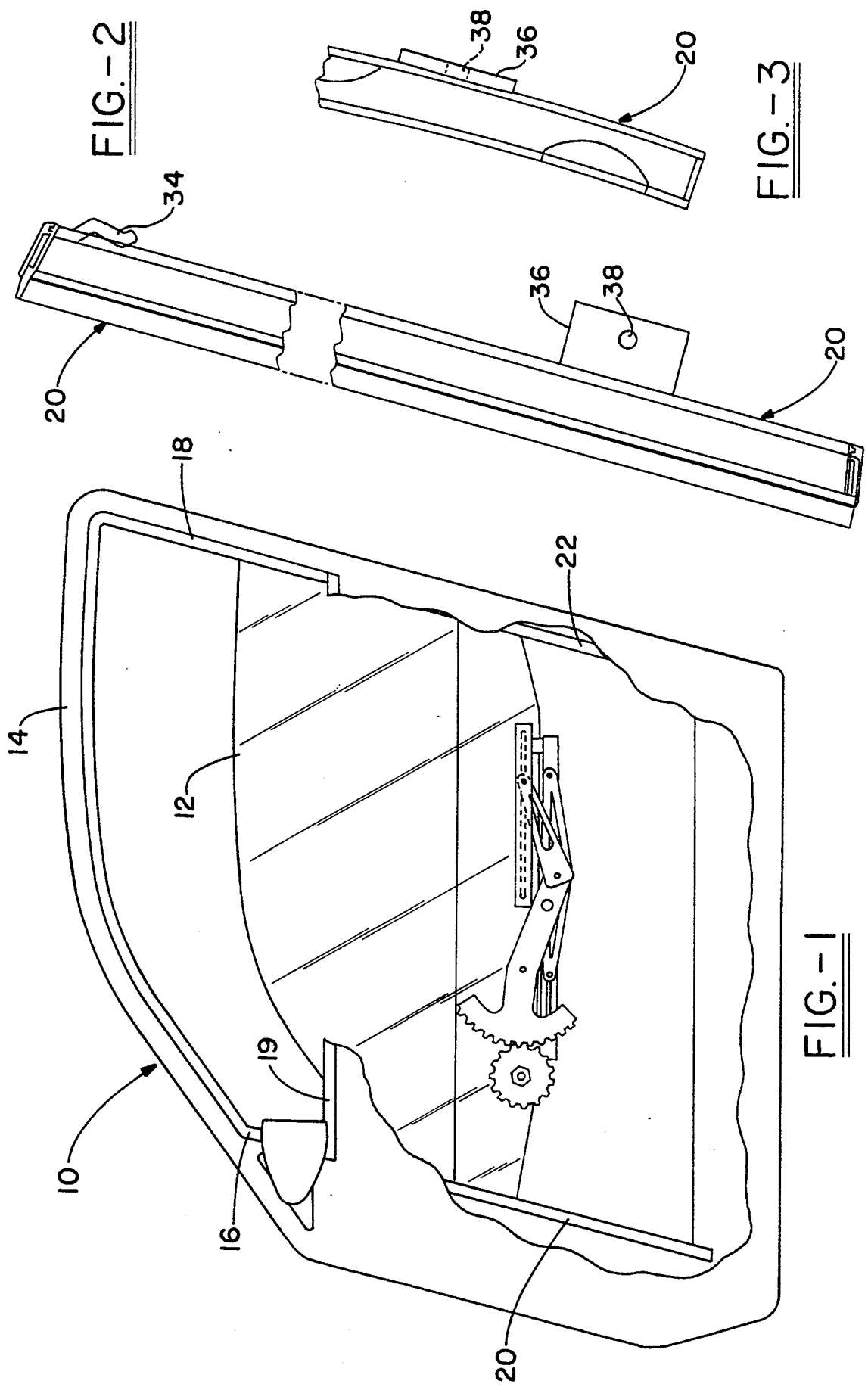

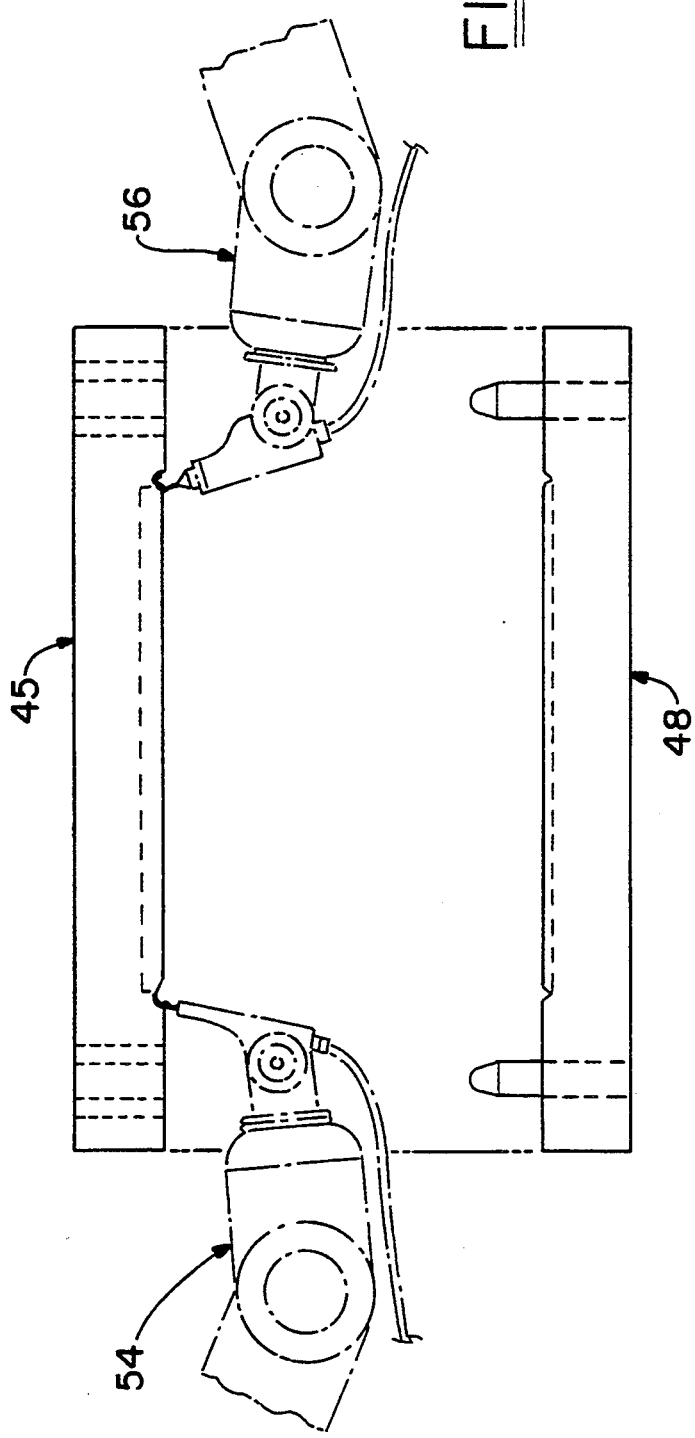
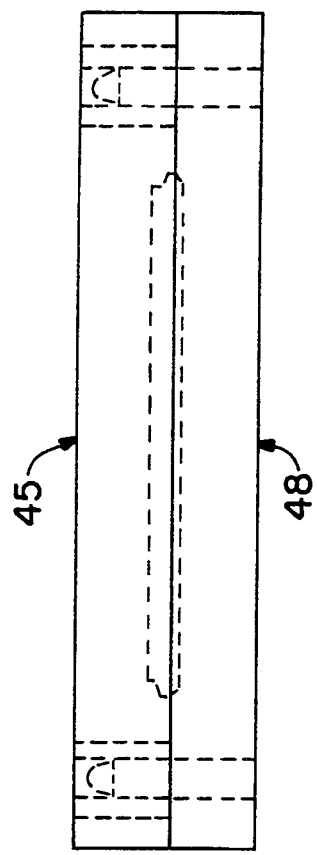

GLASS RUN GUIDE FOR SLIDABLE VEHICLE WINDOW

FIELD OF THE INVENTION

The invention relates generally to a glass run guide member which is disposed within an automotive vehicle door having a slidable window and which serves to smoothly guide the window as it is being lowered into or raised from the well of the door. More particularly, the invention concerns an integrated one-piece glass run guide member which performs two separate functions, that of providing a smooth resilient guide means and that of providing reinforcement to counter lateral forces exerted from the edges of the sliding window during movement thereof, which are conventionally performed by separate components.

BACKGROUND

Automotive vehicle doors are almost invariably provided with a sliding window which can be raised to a position sealingly closing a window opening and which can be lowered to a position wherein the window is stored in a cavity within the vehicle door. The periphery of the window opening in a vehicle door is generally provided with a plurality of polymeric sealing elements having resilient elastomeric characteristics to allow for smooth movement of the window and to ensure sealing engagement between the window and that portion of the door frame defining the window opening, even after thousands of cycles between the open and closed positions over many years of service. The sealing elements surrounding the window opening generally include a header and pillar or side elements which typically have a substantially U-shaped portion into which the edges of the window are received, and a pair of opposing inner and outer beltline sealing elements which are attached to the door frame along the lower edge of the window opening. The header, pillar and beltline sealing elements are generally attached to a pinchweld flange or U-shaped channel formed by the sheet metal defining the doorframe, with the door frame serving as a reinforcement for the sealing elements to stabilize or counter forces exerted by the window along its edges as it is being raised or lowered.

Below the beltline, within the door cavity or well, the window is typically guided by a pair of spaced parallel rails or glass runs. The belowbelt glass runs generally comprise an elastic U-shaped member of, for example, rubber which does not serve a sealing function, but instead provides a nonabrasive, low-friction guide liner which promotes smooth movement of the window as it is being raised or lowered. Typically, the edges of the door frame below the beltline are not in close proximity to the belowbelt glass runs and are therefore unavailable for providing reinforcing support to the elastic member or guide liner to stabilize or counter forces exerted by the window along its edges when it is being raised or lowered as is the case with the window sealing elements. Accordingly, conventional belowbelt guide means generally include a rigid retainer having a U-shaped cross section into which the guide liner is received. The rigid retainer is generally made of a tough, high modulus material such as steel and is rigidly fixed to the frame as by welding or mechanical fasteners. The rigid retainer supports the guide liner and acts to stabilize forces exerted onto the belowbelt glass run by the window especially when it is being raised or lowered.

In FIG. 3 of U.S. Pat. No. 4,098,134, a typical prior art belowbelt glass run 45 comprising an underlying steel support member having a U-shaped channel and an elastomeric liner received within the U-shaped channel is shown. Conventional belowbelt glass runs comprising a support member and separate guide liner are generally adequate for holding the glass on track with a smooth, consistent motion as the window is being raised or lowered in the door. Automobile and automotive component manufacturers are, however, continually endeavoring to provide high quality components which meet or exceed consumer expectations while simultaneously reducing manufacturing and assembly costs. Accordingly, a belowbelt glass run design which is capable of smoothly guiding a window of a vehicle door and which incorporates a simpler design comprising fewer components, thereby reducing manufacturing and assembly costs, would be highly desirable.

SUMMARY OF THE INVENTION

In accordance with the principles of the invention, a glass run channel, including an integrated one-piece glass run guide member, is made from a polymer based composition and has sufficient rigidity to stabilize and effectively counteract forces exerted by the slidable window, along the edges thereof, on to the glass run channel, especially while the window is either being raised from or lowered into the door cavity or well. The polymer based composition, in addition to having sufficient rigidity to eliminate the need for a separate underlying support member has sufficient resilience and a non-abrasive, low friction surface suitable for promoting smooth tracking of the window as it is being raised or lowered. The glass run channel of the invention is preferably made of a fiber reinforced thermoplastic material to provide the aforementioned desirable combination of properties.

The one-piece glass run channel of the invention generally comprises a curved strip having a substantially constant generally U-shaped cross section. Each leg of the U-shaped cross section has a projecting lip portion, one of which engages the inner surface of the window pane near its edge, while the other engages the outer surface of the window pane near its edge to smoothly guide the window during travel between the fully raised or closed position and the fully lowered position of the window. The one-piece glass run channel in addition to smoothly guiding the window also has sufficient strength and rigidity to counter forces exerted from the side edges of the sliding window, thereby eliminating the need for separate belowbelt retainers.

The invention therefore provides a simpler, more efficient one-pieces glass run guide assembly for a slidable vehicle window, which reduces the number of components needed, thereby reducing the amount of time and effort required for installation of the glass run guides, and providing an effective lower cost alternative to conventional glass run assemblies having separate guide and retainer means.

BRIEF DESCRIPTION OF THE DRAWINGS

FIG. 1 is a side elevation view of a vehicle door having a slidable window, portions are broken away to show the guide members contained within the door well;

FIG. 2 is a side elevation view of a guide member in accordance with the invention;

FIG. 3 is a front elevation view of the guide member of FIG. 2;

FIG. 7 is an elevation view of the molding apparatus of FIG. 5 with the mold open and showing robotic means in phantom for applying adhesive and optional functional coating; and FIG. 8 is an elevation view of the molding apparatus of FIG. 5 showing the mold closed with the divider plate removed.

DESCRIPTION OF THE PREFERRED EMBODIMENT

Figure 4:
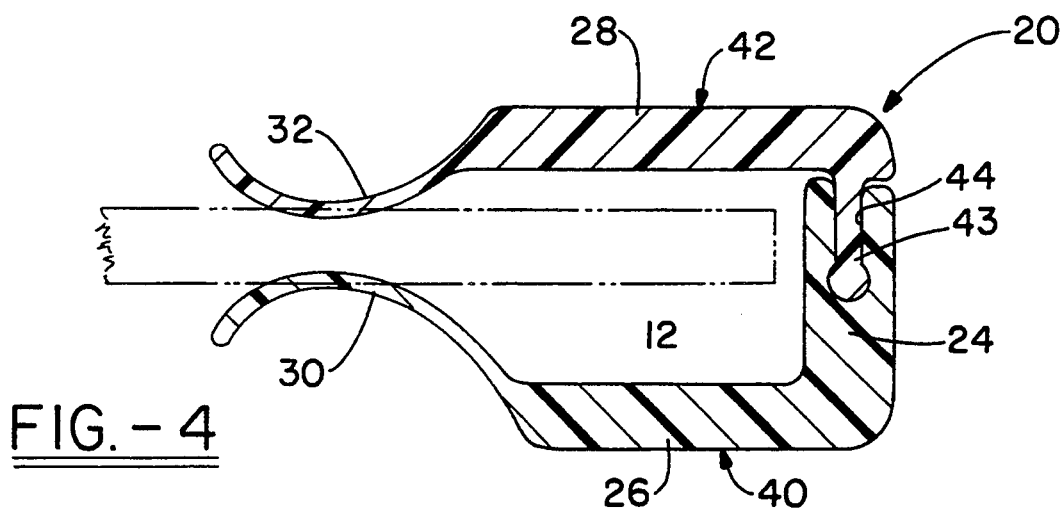
FIG. 4 is a transverse cross-sectional view of the guide member shown in FIGS. 2 and 3.

There is shown in FIG. 1 a left front door 10 of an automobile provided with a slidable glass window 12. The window is capable of being raised or lowered by any of various door window regulator means (not shown) which are well known in the art. The window opening is defined by an upper or header section 14 of the door frame, a pair of laterally spaced pillars 16 and 18, respectively known in the art as the A and B-pillars, and the upper edge of the sheet metal door panels, known in the art as the beltline 19. Above the beltline, the window is guided by sealing elements attached to the door frame along the periphery of the window opening, and retained or restrained from undesirable inboard, outboard, forward and backward movement by the header and pillar sections of the door frame. Below the beltline, the window is guided by a pair of parallel laterally spaced guide members 20 and 22. Because the guide means 20 and 22, particularly the forward guide means 20, are spaced away from the edges of the door frame, the door frame is generally not capable of serving as a retainer means for restraining the window against undesirable inboard, outboard, forward and backward movement of the window. Accordingly, the guide means 20 and 22 must serve the dual functions of providing a resilient, non-abrasive surface which smoothly guides the window along its edges during raising or lowering of the window, and of providing reinforcement or support to counter forces exerted from the edges of the sliding window to prevent undesirable movement thereof.

The guide means 20 and 22 of the invention comprises a one-piece component molded from a polymeric material. The guide means 20 and 22 are generally similar and will therefore be described with reference to the forward guide means 20, shown in FIGS. 2-4; the details of the rearward guide means 22 being readily determinable and obvious from the description of the forward guide means 20.

In FIG. 2, there is shown a side elevational view of forward guide means 20 as seen when facing the inboard side of the guide means. Current vehicle body designs generally include doors and door windows having a small amount of outward curvature, i.e. the exterior surfaces of the door and door window have a generally large radius curved surface about an axis generally parallel with the longitudinal axis of the vehicle. Accordingly, the guide means 20 is preferably a curved strip as shown in FIG. 3 to accommodate the curvature of the window 12.

A transverse cross sectional view of the guide means 20 of the invention is shown in FIG. 4. The guide means generally has a substantially U-shaped overall transverse cross section including a base 24, an inboard leg 26 and an outboard leg 28. The inboard and outboard legs, 26 and 28 respectively, include projecting lip portions 30 and 32 which engage the interior and exterior surfaces respectively of window 12 to smoothly guide it during its upward or downward travel.

In accordance with a preferred aspect of the invention, mounting means are integrally formed during the molding of the guide means. The mounting means preferably includes an integral clip 34 near the upper end of the guide means 20 and 22, and a fastening lug 36 near the bottom end of the guide means and having a central hole 38 for receiving a conventional fastener, such as a threaded bolt which can also, for example, pass through a corresponding hole in the door frame, to fasten the guide means to the door frame. The clip 34 can be adapted to be received in a slotted opening of the door frame, thus simplifying installation procedure so as to include, for example, the steps of sliding the clip through the slotted opening of the frame, and using a single bolt to rigidly secure the guide means 20 to the door frame.

As will be readily appreciated by those of ordinary skill in the art, the disclosed cross-sectional shapes for the guide means of the invention, and the mounting means for securing the guide means to the vehicle door can be readily modified, or adapted to be used vehicle doors having a variety of different shapes and in designs, without departing from the spirit and scope of the invention.

In accordance with the preferred embodiment of the invention, the guide means 20 and 22 are each formed with separate inboard and outboard guide elements 40 and 42, respectively, which are subsequently fused or otherwise joined to one another to provide for a practical, cost effective means of mass production. The guide means are preferably produced by a split mold process wherein the inboard and outboard guide elements 40 and 42 are simultaneously injection molded in a mold assembly having two mold cavities separated by a removable divider plate. The mold is opened after the two guide elements are formed and the divider plate is removed. After the divider plate has been removed, adhesives are applied to selected surfaces of one or both of the guide elements 40 and 42. With the adhesive having been applied to at least one of the guide elements, the mold is reclosed without the divider and the two guide elements are bonded to one another to form a one-piece guide member, such as 20 or 22, which is adapted to facilitate smooth movement of the glass window 12 as it is being raised or lowered and to provide rigid retaining means whereby forces exerted from the edges of the window are countered to inhibit or prevent undesirable inboard, outboard, forward or rearward movement of the window. The guide elements 40 and 42 are preferably formed with interlocking means, such as a tongue 43 and groove 44, which facilitate or enhance joining of the guide elements. Thus, while it is presently preferred that the guide elements be joined by a combination of adhesives and interlocking means, it is also possible to secure the guide elements together using adhesives alone or interlocking means alone.

Figure 5:
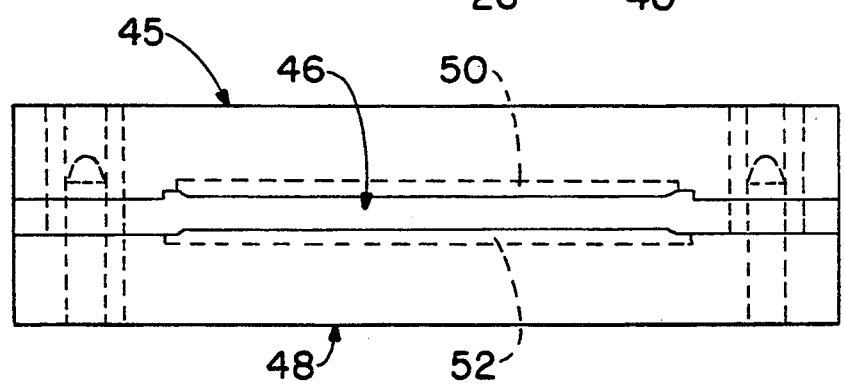
FIG. 5 is an elevation view of a molding apparatus for molding a guide member in accordance with the preferred embodiment of the invention.

An injection press molding apparatus suitable for forming the glass run guide members 20 or 22 of the invention is shown in FIGS. 5-8. The mold generally comprises an upper die plate 45, a removable divider plate 46, and a lower die plate 48. The upper die plate and one side of the removable divider plate together define the mold cavity 50 for one of the guide elements 40 or 42, and the lower die plate and the other side of the removable divider plate together define the mold cavity 52 for the other guide element. With the mold closed as shown in FIG. 5, a suitable moldable thermoplastic or thermosetting polymeric composition, preferably containing fiber reinforcement, is substantially simultaneously injected into both of the mold cavities 50 and 52. Thermoplastic polymers are generally preferred because they have lower cycle times and are more easily compounded to consistently and repeatedly produce seal assemblies having any of a wide variety of desirable properties.

Figure 6:
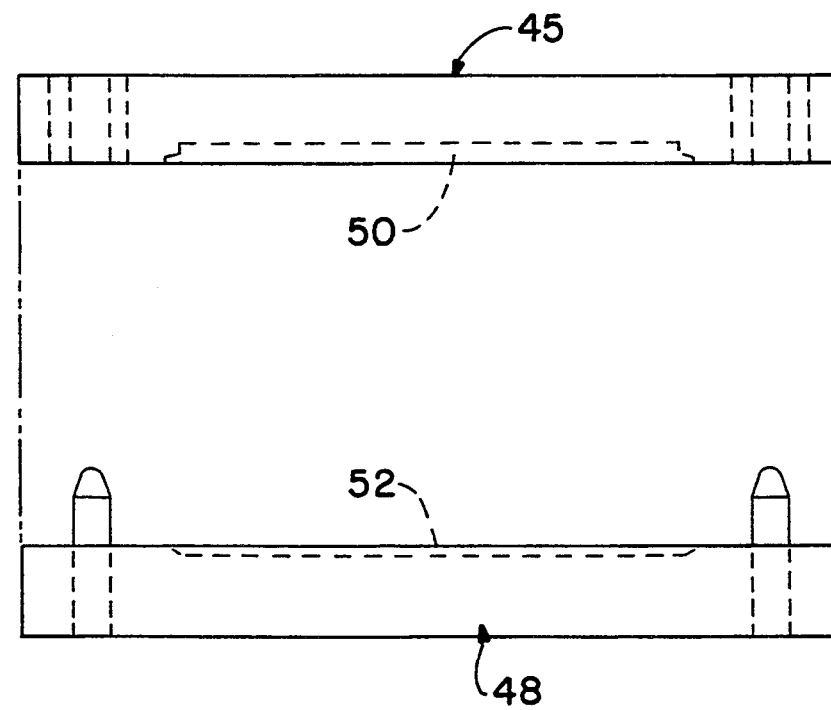
FIG. 6 is an elevation view of the molding apparatus of FIG. 5 with the mold open and with the divider plate removed.

After the inboard and outboard guide elements have been formed, the mold is opened and the divider plate 46 is removed as shown in FIG. 6. With the mold open, adhesive materials are then applied to selected surfaces of the inboard, outboard, or both guide elements, preferably by preprogrammed robotic means 54 as shown in FIG. 7. Additionally, functional coating, such as flocking adhesive or low friction coating, can be applied if desired, also preferably by preprogrammed robotic means 56. Thereafter, as shown in FIG. 8, the mold is again closed, without the divider between the inner and outer dies, to secure the guide elements 40 and 42 together. Optionally, heat can be applied to the mold to, for example, cure the adhesive if a heat curable adhesive is selected, or to fuse the elements together to form a one-piece guide means, such as 20 or 22. The mold is then opened and optionally flocking can be applied if desired. Alternatively, an optional low friction coating can be applied to selected surfaces such as the surfaces of the lip portions 30 and 32 which contact the surfaces of window 12. The completed guide means 20 or 22 is then removed from the mold and the process can then be repeated to produce additional guide means.

Alternatively, the guide means of the invention can be formed in a mold assembly having a single mold cavity. However, due to the complicated geometry of the guide means, the aforementioned split mold process is preferred.

An essential characteristic of the invention is that the guide means be provided with a low friction, non-abrasive surface for engaging the interior and exterior surfaces of the window near the edges thereof to provide for smooth movement of the window along the guide during raising or lowering of the window, while simultaneously having sufficient strength and rigidity to counter the forces exerted by the edges of the window to prevent undesirable inboard, outboard, forward or rearward movement during normal operation of the window. Accordingly, the window guide means of the invention is produced of a resilient polymeric material simultaneously possessing a low coefficient of friction with glass, and a relatively high modulus, flexural and tensile strength. Suitable thermoplastics include polypropylene, polyamide, polyester, polyurethane, polyacetal, polyethylene, polyvinyl chloride, acrylonitrile-butadiene-styrene, acrylic-styrene-acrylonitrile, fluoro polymers, and other typical thermoplastics or alloys thereof. Suitable thermosetting compositions include crosslinked polyurethane, high modulus elastomers, such as EPDM, and other suitable thermosets with plastic characteristics such as epoxies.

The polymeric materials used to form the vehicle door window guide means of the invention can be compounded with various conventional additives known in the art including antioxidants, antimicrobials, lubricants, mold release agents, plasticizers, and the like, as desired.

While in accordance with the Patent Statutes, the best mode and preferred embodiment has been set forth, the scope of the invention is not limited thereto, but rather by the scope of the attached claims.

What is claimed is:

1. A one-piece glass run guide for a slidable vehicle window, comprising an elongate molded polymeric strip having a substantially U-shaped transverse cross section including a base, an inboard leg and an outboard leg, each of the legs having a projecting lip portion which engages interior and exterior surfaces, respectively, of a slidable vehicle window said glass run guide being substantially vertically disposed below a beltline within a vehicle door cavity such that said interior and exterior surfaces adjacent lateral edges of said slidable vehicle window are substantially continuously engaged by said lip portions below said beltline.

2. A glass run guide as set forth in claim 1, wherein said one-piece guide is an assembly of a molded inboard guide element and a molded outboard guide elements which are joined to each other.

3. A glass run guide as set forth in claim 2, wherein the guide elements are adhesively joined to each other.

4. A glass run guide as set forth in claim 3, wherein the interlocking means are a groove formed on one of the elements and a cooperating interlocking tongue formed on the other element.

5. A glass run guide as set forth in claim 2, wherein the guide elements each include interlocking means integrally formed during molding of the guide elements, said elements being joined to each other by said interlocking means.

6. A glass run guide as set forth in claim 5, wherein the guide elements are adhesively joined to each other by a combination of an adhesive composition and interlocking means integrally formed during molding of the guide elements.

7. A glass run guide as set forth in claim 1, further comprising mounting means integrally formed during molding of the guide means.

8. A glass run guide as set forth in claim 7, wherein the mounting means consists essentially of a clip and a fastening lug having a hole through which a fastener can be passed for securing the glass run guide to a vehicle door frame, whereby said glass run guide is installed with a single fastener.

9. A glass run guide as set forth in claim 1, which has sufficient strength and rigidity to counter forces exerted by a sliding vehicle window during normal operation thereof to prevent undesirable inboard, outboard, forward and rearward movement of the window.

10. A glass run guide as set forth in claim 9, wherein at least the surfaces of the lip portions which contact the surfaces of the slidable vehicle window are low friction, non-abrasive surfaces which provide for smooth movement of the window along the guide during raising or lowering of the window.

11. A glass run guide as set forth in claim 10, wherein a low friction coating is applied to the surfaces of the lip portions which contact the surfaces of the slidable vehicle window.

12. A glass run guide as set forth in claim 10, wherein flocking is applied to the surfaces of the lip portions which contact the surfaces of the slidable vehicle window.

13. A glass run guide as set forth in claim 9, which is formed from a fiber reinforced thermoplastic polymer composition.

14. A glass run guide as set forth in claim 13, wherein the fiber reinforcement is glass fiber, and wherein the thermoplastic is selected from the group consisting of EPDM, polypropylene, polyamide, polyester, polyurethane, polyacetal, polyethylene, polyvinyl chloride, acrylonitrile-butadiene-styrene, acrylic-styrene-acrylonitrile, fluoro polymers, and other typical thermoplastics or alloys thereof.

15. A glass run guide as set forth in claim 9, which is formed from a fiber reinforced thermosetting polymer composition.

16. A glass run guide as set forth in claim 15, wherein the fiber reinforcement is glass fiber, and wherein the thermosetting polymer is selected from the group consisting of unsaturated polyesters, crosslinked polyurethane, high modulus elastomers, and epoxy resins.

17. A one-piece glass run guide for a slidable vehicle window, comprising an elongate molded polymeric strip having a substantially U-shaped transverse cross section including a base, an inboard leg having a projecting lip portion which engages an interior surface of a slidable vehicle window, an outboard leg having a projecting lip portion which engages an exterior surface of the slidable vehicle window said glass run guide being substantially vertically disposed below a beltline within a vehicle door cavity such that said interior and said exterior surfaces adjacent lateral edges of said slidable vehicle window are substantially continuously engaged by said lip portions below said beltline; the surfaces of the lip portions which contact the surfaces of the slidable vehicle window being low friction, non-abrasive surfaces to provide for smooth movement of the window along the guide during raising or lowering of the window; the guide being formed of a fiber reinforced polymer having sufficient strength and rigidity to counter forces exerted by the sliding vehicle window to prevent undesirable inboard, outboard, forward and rearward movement of the window; and integral mounting means for fastening the guide to a vehicle door frame.

18. A glass run guide as set forth in claim 17, which is formed from a glass fiber reinforced thermoplastic polymer composition, and wherein the thermoplastic polymer is selected from the group consisting of EPDM, polypropylene, polyamide, polyester, polyurethane, polyacetal, polyethylene, polyvinyl chloride, acrylonitrile-butadiene-styrene, acrylic-styrene-acrylonitrile, fluoro polymers, and other typical thermoplastics or alloys thereof.

19. A glass run guide as set forth in claim 17, which is formed from a glass fiber reinforced thermosetting polymer composition, and wherein the thermosetting polymer is crosslinked polyurethane, high modulus elastomers, or epoxy resin.

* * * * *